H. D. LATHROP.
CARGO STOP.
APPLICATION FILED JUNE 20, 1918.
1,336,569.
Patented Apr. 13, 1920.
2 SHEETS—SHEET 2.
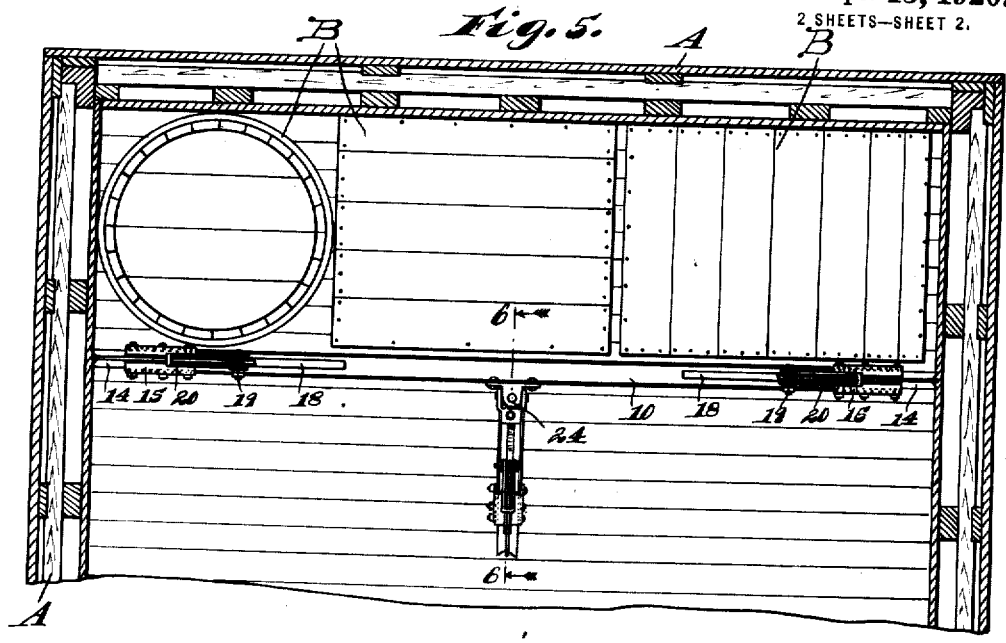
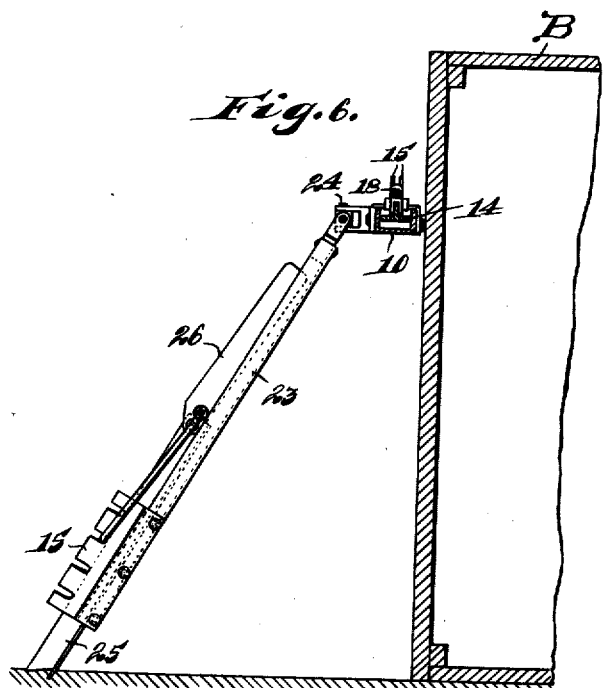
Witnesses:
C. E. Wendt.
A. A. Olm.
Inventor.
Harry D. Lathrop,
By Joshua R. H. Potts
his Attorney.

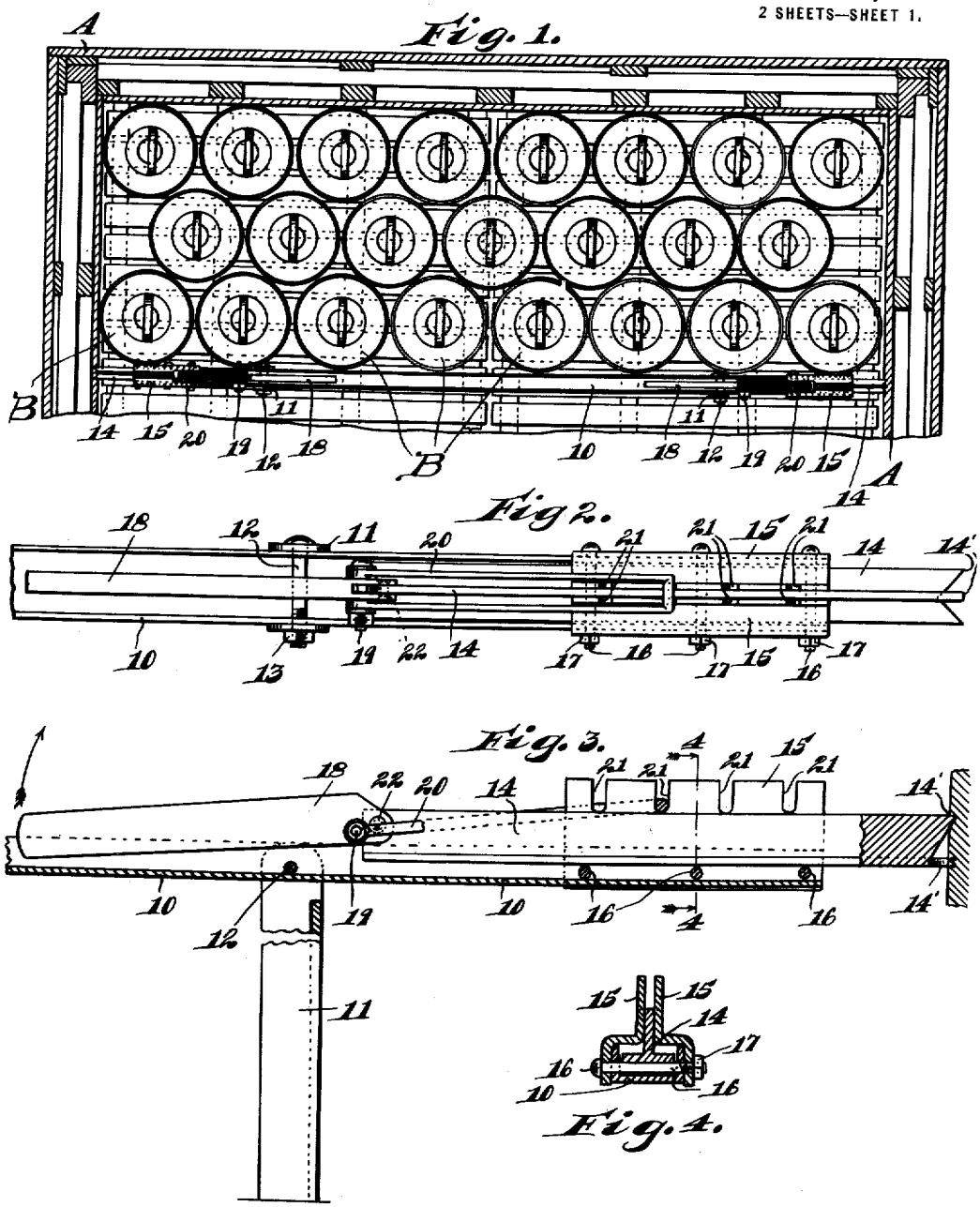

UNITED STATES PATENT OFFICE.

HARRY D. LATHROP, OF CHICAGO, ILLINOIS.

CARGO-STOP.

1,336,569.   Specification of Letters Patent.   Patented Apr. 13, 1920.

Application filed June 20, 1918. Serial No. 240,940.

*To all whom it may concern:*

Be it known that I, HARRY D. LATHROP, a citizen of the United States, and a resident of the city of Chicago, county of Cook, and State of Illinois, have invented certain new and useful Improvements in Cargo-Stops, of which the following is a specification.

My invention relates to improvements in cargo stops, and has for its object the production of a device of this character, which will be of durable and economical construction, and which may be readily and easily applied to effect secure anchoring of a cargo in a freight car or other similar place.

Other objects will appear hereinafter.

The invention consists in the combinations and arrangements of parts hereinafter described and claimed.

The invention will be best understood by reference to the accompanying drawings forming a part of this specification, and in which, Figure 1, is a horizontal section through one end of a conventional freight car in connection with which is shown a cargo stop embodying the invention, Fig. 2, an enlarged top plan view of one end of the cargo stop, Fig. 3, a central vertical longitudinal section of the construction seen in Fig. 2.

Fig. 4, a section taken on line 4—4 of Fig. 3,

Fig. 5, a view similar to Fig. 1, showing a slightly modified form of construction, and Fig. 6, an enlarged section taken on substantially line 6—6 of Fig. 5.

The preferred form of construction, as illustrated in the drawings, comprises an elongated channel bar 10 of a length adapting the same to be received in a freight car, the length of said bar being slightly less than the width of the interior of the car. Coöperating with the opposite ends of said bar are legs 11, pivotally connected thereto by bolts 12 and coöperating nuts 13, the arrangement being such that said legs will be adapted for pivotal adjustment to any inclined position desired in order to support the bar 10 at various elevations. Through adjustment of nuts 13, the legs 11 may be locked in any position of angular adjustment.

Slidably mounted in each end of bar 10 is a jaw 14 of inverted T-form in cross section, said jaw being held in place in the channel of member 10 by means of a pair of angular holding members 15 which are secured to the bar 10 by means of bolts 16 and coöperating nuts 17. The bolts 16 serve also as supports for the jaw 14, the latter being adapted to slide thereon, as clearly seen in Figs. 3 and 4, friction being thus reduced to a minimum.

Coöperating with each of the jaws 14 is an operating lever 18, which is fulcrumed at 19 to one end of an anchoring and fulcrum-forming member 20, which is of substantially U-shape, with the ends of the U pivotally connected with said lever, the bight of the U being adapted for engagement with any one of a plurality of spaced notches 21 formed in the upper edges of the members 15. With this arrangement it will be seen that the lever 18 may be shifted longitudinally of the bar 10 so as to position the fulcrum thereof at any desired position to adapt the device for employment in connection with cars of various widths. The lever is connected with the rearward end of the corresponding jaw 14 at 22 so that said jaw will be longitudinally shifted upon pivotal movement of the lever. The arrangement is such, as will be seen, that when the levers are rocked inwardly, that is, toward each other, the jaws 14 will be moved outwardly for engagement with the opposite sides or walls of the car A in connection with which the device is employed. Through the shifting adjustment permitted the anchoring fulcrum-forming members 20, as just described, it will be seen that the jaws 14 are adapted to be adjusted bodily longitudinally of the bar 10 in order to adapt the device for use in connection with cars of various widths. The outer ends of jaws 14 are formed with points 14', which are adapted to sink into the surfaces engaged, thus preventing any accidental disengagement of the jaws. Each lever 18 is so mounted and connected with the corresponding member 20 that when said lever is rocked inwardly and downwardly to its lower terminal of movement, the same will have passed just beyond the dead center, which will serve to automatically lock the lever in operative position, it being clear that any inward pressure exerted upon the jaws, after said levers have reached their operative position, tends only to rock said levers downwardly or, in other words, to hold said levers in operative position.

In use, the cargo or articles B which are to be anchored or held against shifting in the railway car, are crowded together so as to snugly engage with one another. The device is then placed against the cargo and the levers 18 adjusted to effect engagement of the jaws 14 with the sides of the car, thereby serving to lock the device to the car and hence to securely lock the cargo against any shifting. This locking of the cargo prevents accidents and damage which otherwise frequently occur in a partially loaded car, since in the latter case the cargo will shift under the severe jolting and jarring to which the same is subjected in the movement of the car. With the construction in question however, all shifting or relative movement of the cargo is positively prevented, and thus the objection referred to obviated.

If desired, the device as described may be provided with an additional or auxiliary brace member 23 for bracing the center of the bar 10. In this case the member 23 will be connected at 24 with the bar 10 midway the ends thereof in a manner permitting of universal pivotal movement of the member 23 so that the latter, when not in use, may be rocked upwardly to lie parallel with the bar 10. The pivotal connection of the legs 11 with the bar 10 also permits of said legs being rocked upwardly to assume positions parallel with said bar when the device is not in use. The member 23 will be provided at its lower end with a jaw 25 of the same construction as the jaw 14 above described, the jaw 25 being longitudinally shiftable through the medium of a lever 26 mounted and arranged in precisely the same manner as the levers 18 above described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A cargo stop comprising an elongated member; a longitudinally shiftable jaw on said member adapted to protrude from one end thereof; and manually operable means for shifting said jaw into and out of operative positions, said means comprising a lever pivotally connected with said member and having an operative connection with said jaw, whereby pivotal movement of said lever effects shifting movement of said jaw, said lever being adapted to be rocked past dead center to lock the same in operative position, substantially as described.

2. A cargo stop comprising an elongated member; a longitudinally shiftable jaw on said member adapted to protrude from one end thereof; manually operable means for shifting said jaw into and out of operative positions, said means comprising a lever pivotally connected with said member and having an operative connection with said jaw, whereby pivotal movement of said lever effects shifting movement of said jaw, said lever being shiftable longitudinally of said member; and means for releasably locking said lever in positions of shiftable adjustment, comprising an anchoring element engaged by said lever, said element being shiftable to various positions along said member and being adapted to engage with said member in any of said positions, substantially as described.

3. A cargo stop comprising an elongated member; a longitudinally shiftable jaw on said member adapted to protrude from one end thereof; manually operable means for shifting said jaw into and out of operative positions, said means comprising a lever pivotally connected with said member and having an operative connection with said jaw, whereby pivotal movement of said lever effects shifting movement of said jaw, said lever being shiftable longitudinally of said member; means for releasably locking said lever in positions of shiftable adjustment, said locking means comprising a plurality of spaced notches in said member; and anchoring means connected with said lever and engageable with said notches, substantially as described.

4. A cargo stop comprising an elongated member; a longitudinally shiftable jaw on said member adapted to protrude from one end thereof; manually operable means for shifting said jaw into and out of operative positions, said means comprising a lever pivotally connected with said member and having an operative connection with said jaw, whereby pivotal movement of said lever effects shifting movement of said jaw, said lever being shiftable longitudinally of said member; means for releasably locking said lever in positions of shiftable adjustment, said locking means comprising a plurality of spaced notches in said member; and an anchoring and fulcrum-forming member pivotally connected with said lever and engageable with said notches, substantially as described.

5. A cargo stop comprising an elongated longitudinally adjustable member; and legs depending from said member and pivotally adjustable relative thereto, substantially as described.

6. A cargo stop comprising an elongated longitudinally adjustable member; and an auxiliary brace coöperating with and extending rearwardly from said member intermediate its ends, substantially as described.

7. A cargo stop comprising an elongated longitudinally adjustable member; and an auxiliary brace pivotally connected with and extending rearwardly from said member intermediate its ends, substantially as described.

8. A cargo stop comprising an elongated longitudinally adjustable member; and a longitudinally adjustable auxiliary brace coöperating with and extending rearwardly from said member intermediate its ends, substantially as described.

9. A cargo stop comprising an elongated member having a longitudinally extending channel at one end; a jaw slidably mounted in said channel; and means for locking said jaw in positions of longitudinal adjustment, substantially as described.

10. A cargo stop comprising an elongated member; a longitudinally shiftable jaw on said member adapted to protrude from one end thereof; and a lever for actuating said jaw, said lever being adapted to be rocked past dead center to lock the same in operative position, substantially as described.

In testimony whereof I have signed my name to this specification in the presence of two subscribing witnesses.

HARRY D. LATHROP.

Witnesses:
   Joshua R. H. Potts,
   Helen F. Lillis.